(12) United States Patent
Han et al.

(10) Patent No.: US 7,865,033 B2
(45) Date of Patent: Jan. 4, 2011

(54) METHOD AND APPARATUS FOR CONTROLLING CONTRAST

(75) Inventors: Young-ran Han, Yongin-si (KR); Hyun-wook Ok, Yongin-si (KR); Du-sik Park, Yongin-si (KR); Seong-deok Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 995 days.

(21) Appl. No.: 11/674,744

(22) Filed: Feb. 14, 2007

(65) Prior Publication Data
US 2008/0037868 A1 Feb. 14, 2008

(30) Foreign Application Priority Data
Feb. 14, 2006 (KR) ........................ 10-2006-0014269

(51) Int. Cl.
*G06K 9/40* (2006.01)
(52) U.S. Cl. ........................ 382/274; 382/168; 348/353; 702/180
(58) Field of Classification Search ............... 348/28, 348/353, 365, 603, 672, 673, 678, 686, E5.119; 358/522; 382/168, 169, 172, 270, 274; 702/180
See application file for complete search history.

(56) References Cited

U.S. PATENT DOCUMENTS

| | | | |
|---|---|---|---|
| 6,018,588 A * | 1/2000 | Kim | ........................... 382/167 |
| 6,049,626 A | 4/2000 | Kim | |
| 6,078,686 A | 6/2000 | Kim | |
| 6,507,372 B1 | 1/2003 | Kim | |
| 6,549,239 B1 | 4/2003 | Tao | |
| 6,650,774 B1 | 11/2003 | Szeliski | |
| 2002/0024529 A1 * | 2/2002 | Miller et al. | ................ 345/690 |
| 2003/0002736 A1 * | 1/2003 | Maruoka et al. | ............ 382/168 |
| 2004/0008903 A1 * | 1/2004 | Kim | ........................... 382/274 |
| 2004/0208366 A1 | 10/2004 | Kuwata | |
| 2005/0031201 A1 | 2/2005 | Goh | |
| 2007/0104387 A1 | 5/2007 | Han et al. | |
| 2008/0037868 A1 | 2/2008 | Han et al. | |

FOREIGN PATENT DOCUMENTS

| | | |
|---|---|---|
| KR | 10-0243301 B1 | 11/1999 |
| KR | 10-0298412 B1 | 5/2001 |
| KR | 10-0319864 B1 | 12/2001 |
| KR | 10-0437807 B1 | 6/2004 |

OTHER PUBLICATIONS

USPTO Office Action dated Nov. 17, 2009 issued in co-pending U.S. Appl. No. 11/584,666.

* cited by examiner

*Primary Examiner*—Matthew C Bella
*Assistant Examiner*—Gregory F Cunningham
(74) *Attorney, Agent, or Firm*—Sughrue Mion, PLLC (57) ABSTRACT

A method and apparatus for contrast control is provided. The apparatus includes a cumulative density function which provides a second cumulative density function modified from a first cumulative density function based on a first luminance histogram of an input image; a transformer function provider which provides a transform function based on the first cumulative density function and the second cumulative density function; a compensation unit which compensates the transform function based on a predetermined illumination level; and a transform unit which transforms a luminance distribution of the input image based on the compensated transform function.

24 Claims, 9 Drawing Sheets

METHOD AND APPARATUS FOR CONTROLLING CONTRAST

CROSS-REFERENCE TO RELATED APPLICATION

This application claims priority from Korean Patent Application No. 10-2006-0014269 filed on Feb. 14, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to contrast control, and more particularly to controlling contrast according to illumination levels.

2. Description of the Prior Art

Development in digital electronic engineering technologies has led to the digitizing of conventional analog data, and has thus induced emergence of digital-image-signal-processing technologies for digitizing and processing image signals. Usually, digital-image-signal-processing technologies can improve the storage and transmission efficiency of image information by compressing the image information, and can perform various types of image processing: for example, the digital-image-signal-processing technologies can provide an output image that looks better than an input image. As one such digital-image-signal-processing technology, a technology for improving the contrast of an image is being actively researched.

As a representative example of related art technologies for improving the contrast of an image, the luminance histogram equalization technique is widely known. According to the luminance histogram equalization, a luminance histogram of an input image is analyzed, and is then controlled to have a uniform distribution, so as to improve the contrast of the input image. The luminance histogram shows a luminance distribution for pixels within an image, that is, the luminance histogram expresses distribution ranges and values of bright points and dark points within an image.

However, because the related art luminance histogram equalization technique uses only an algorithm depending on a luminance histogram of an input image, it may excessively increase the contrast. As a result, the related art luminance histogram equalization technique may cause an output image to look unnatural.

Also, the related art luminance histogram equalization technique is problematic in that the brighter the environment, the lower the visibility.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and an apparatus that may improve contrast while preventing excessive contrast.

The present invention also provides a method and an apparatus that can improve the visibility of an image according to luminance of environments.

According to an aspect of the present invention, there is provided a method of controlling contrast, the method including providing a second cumulative density function modified from a first cumulative density function based on a first luminance histogram of an input image; providing a transform function by using the first cumulative density function and the second cumulative density function; compensating the transform function according to a predetermined illumination level; and transforming a luminance distribution of the input image by using the compensated transform function.

According to another aspect of the present invention, there is provided an apparatus for controlling contrast, the apparatus including a cumulative density function (CDF) modification unit providing a second cumulative density function modified from a first cumulative density function based on a first luminance histogram of an input image; a transform-function provider providing a transform function by using the first cumulative density function and the second cumulative density function; a compensation unit compensating the transform function according to a predetermined illumination level; and a transform unit transforming a luminance distribution of the input image by using the compensated transform function.

BRIEF DESCRIPTION OF THE DRAWINGS

The above and other aspects of the present invention will be apparent from the following detailed description of the exemplary embodiments taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings. The matters defined in the description such as a detailed construction and elements are nothing but the ones provided to assist in an understanding of the invention. Thus, it is apparent that the present invention can be carried out without those defined matter. In the following description of the present invention, the same drawing reference numerals are used for the same elements even in different drawings. Also, a detailed description of known functions and configurations incorporated herein will be omitted when it may make the subject matter of the present invention rather unclear.

Figure 1:
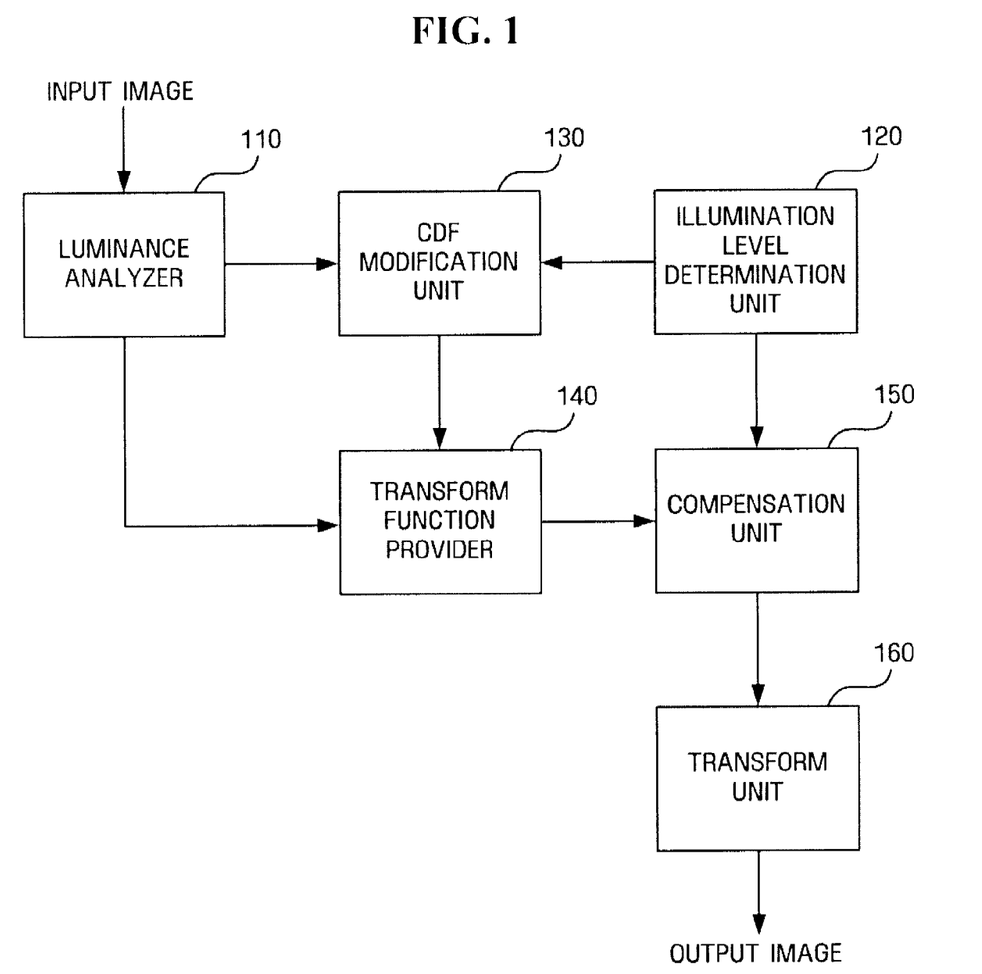
FIG. 1 is a block diagram illustrating a contrast control apparatus according to an exemplary embodiment of the present invention.

FIG. 1 is a block diagram illustrating a contrast control apparatus according to an exemplary embodiment of the present invention.

The illustrated contrast control apparatus includes a luminance analyzer 110, an illumination level determination unit 120, a Cumulative Density Function (CDF) modification unit 130, a transform function provider 140, a compensation unit 150, and a transform unit 160.

The luminance analyzer 110 extracts a luminance histogram from an input image, and provides a cumulative density function (CDF) for the extracted luminance histogram. For example, the luminance analyzer 110 counts pixel frequencies according to luminance levels and generates the luminance histogram based on the result of the counting. Then, the luminance analyzer 110 can calculate a probability density function (PDF) based on the luminance histogram, and can calculate the cumulative density function through integration for the PDF. An example of the cumulative density function F(x), which can be obtained by the method described above, is defined by equation (1) below.

$$F(x) = \sum_{i=0}^{N} n_i \quad (1)$$

In equation (1), $n_i$ denotes the number of pixels having a luminance level i within an input image. For reference, if the entire number of pixels within one image is N, it is true that:

$$N = \sum_{i=0}^{L_{max}} n_i,$$

in which $L_{max}$ denotes a maximum value of the luminance level, which can exist in the image. Because the luminance level typically has a value of 0-255, $L_{max}$ may have a value of 255.

The illumination level determination unit 120 determines an illumination level within an environment in which the contrast control apparatus operates. The illumination level represents the brightness of the environment in which the contrast control apparatus operates. The higher the illumination level, the brighter the environment.

According to an exemplary embodiment of the present invention, the illumination level determination unit 120 may include an illumination measurer, such as a photocell illuminometer, a phototube illuminometer, or a photo-multiplier tube illuminometer. Then, the illumination level determination unit 120 can automatically measure the illumination level of the environment in which the contrast control apparatus operates, and can determine the illumination level based on the result of the measurement.

For another example, the illumination level determination unit 120 may include a plurality of buttons corresponding to preset illumination levels. Then, a user can select one of the buttons according to the brightness of the environment, and the illumination level determination unit 120 provides an illumination level corresponding to the selected button. Otherwise, the illumination level determination unit 120 may provide a graphical user interface (GUI) for selection of the illumination level. Then, a user can select a desired illumination level through the GUI provided by the illumination level determination unit 120.

The CDF modification unit 130 provides a new cumulative density function modified from the cumulative density function provided by the luminance analyzer 110. In the following description, the cumulative density function provided by the luminance analyzer 110 is referred to as a first cumulative density function and the cumulative density function provided by the CDF modification unit 130 is referred to as a second cumulative density function, in order to aid understanding of the present invention. Further, a luminance histogram of an input image is referred to as a First luminance histogram, and a virtual luminance histogram having the second cumulative density function is referred to as a second luminance histogram.

When the first cumulative density function is used as a transform function, the output image may become unnatural due to increase of the contrast as pointed out as a problem of the related art. The second cumulative density function may be used in order to reduce such a problem. There may be various embodiments which provide the second cumulative density function. For example, it is possible to provide the second cumulative density function either according to the illumination levels or through pixel re-distribution for the input image. The cumulative density function-modification unit 130 may be described later in more detail with reference to FIGS. 3 to 8.

The transform function provider 140 provides a transform function by using the first cumulative density function and the second cumulative density function. Hereinafter, an example of a process for generating a transform function provided by the transform function provider 140 will be described.

If an input image is input as A and a new image obtained in the case of using the first cumulative density function as the transform function is put as B, A and B have a relation defined by equation (2) below.

$$B = F(A) \quad (2)$$

In equation (2), function F( ) represents the first cumulative density function.

Meanwhile, given that an image having the second luminance histogram is C, if it is possible to obtain a new image V by using the second cumulative density function, C and V have a relation defined by equation (3) below.

$$V = G(C) \quad (3)$$

In equation (3), function G( ) represents the second cumulative density function.

If it is a goal to finally obtain an image C which has a new luminance distribution in comparison with an input image, it is possible to obtain C by using an inverse function of the second cumulative density function, as shown by equation (4) below.

$$C = G^{-1}(F) \quad (4)$$

If the virtual image f in equation (4) is replaced by the image B obtained from the input image A by using the first cumulative density function as a transform function, it is possible to obtain a solution by equation (5) below.

$$C = G^{-1}(B) \quad (5)$$
$$= G^{1}(F(A))$$
$$= H(A)$$

In equation (5), H( ) denotes a transform function which is finally generated according to an exemplary embodiment of the present invention. The transform function can be expressed in more detail as defined by equation (6) below.

$$H = G^{-1} \cdot F \quad (6)$$

That is, the transform function, which is obtained through calculation by the transform function provider 140 using the first cumulative density function and the second cumulative density function, is a composite function of the first cumulative density function and the inverse function of the second cumulative density function.

Referring again to FIG. 1, the compensation unit 150 compensates for the transform function provided by the transform function provider 140 according to the illumination level provided by the illumination level determination unit 120. The higher the illumination level is, the more difficult it is for a user to distinguish a dark region in the output image. Therefore, the transform function may be calculated so that the compensated transform function can raise the luminance of the dark region in the input image as the illumination level rises. According to an exemplary embodiment of the present invention, the compensation unit 150 changes a dynamic range of the transform function provided by the transform function provider 140 according to the illumination level provided by the illumination level determination unit 120.

Figure 2:
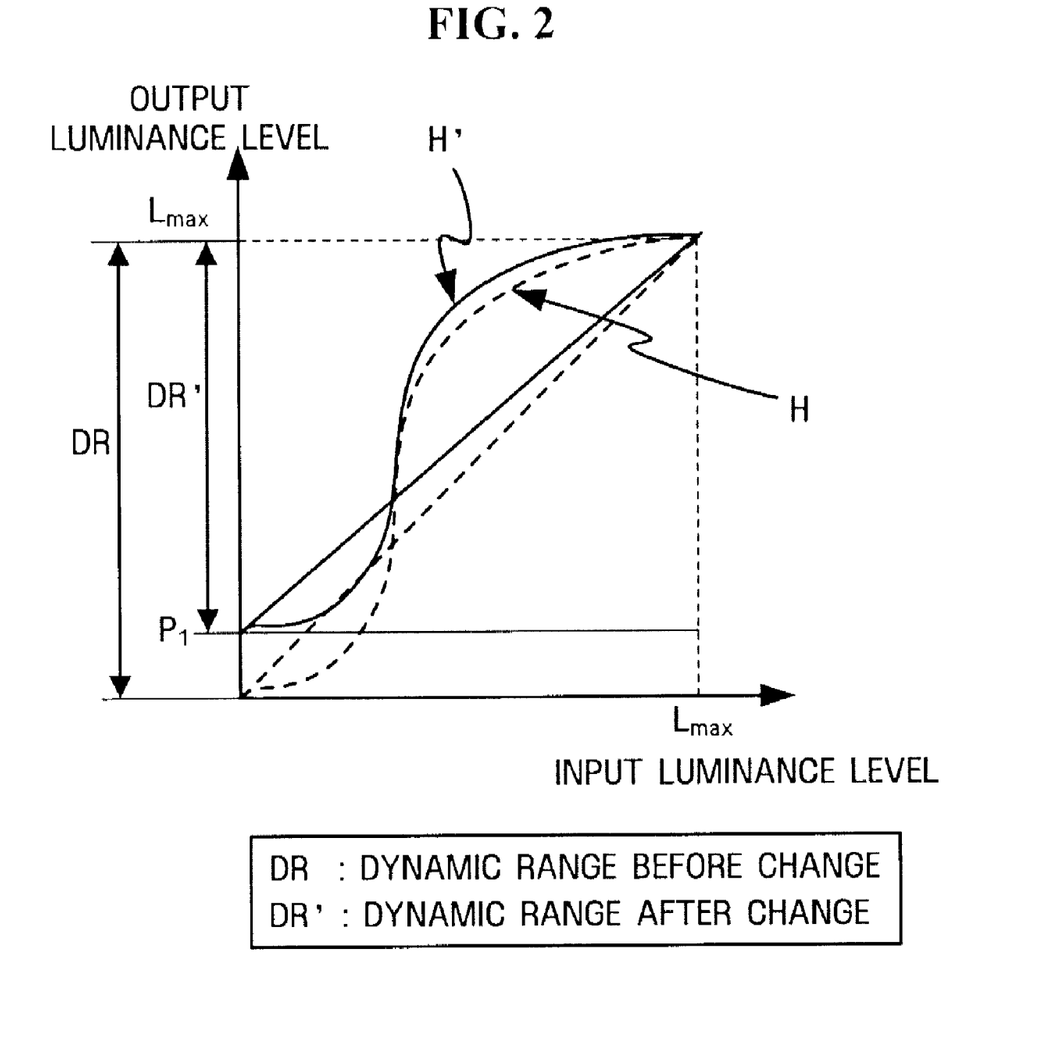
FIG. 2 is a graph illustrating an example of change in a dynamic range of a transform function.

FIG. 2 is a graph illustrating an example of change in a dynamic range of a transform function. As noted from FIG. 2, the range of the output value of the transform function H' after the compensation changes the output luminance level to a range from $P_1$ to $L_{max}$. As a result, the levels below $P_1$, which may have looked immersed in the high illumination level of the environment before the compensation, are raised above $P_1$, so that the visibility is changed.

In order change the dynamic range of the transform function, the compensation unit 150 may use equation (7) below.

$$H' = aH + P_1 (0 \leq P_1 \leq 1) \quad (7)$$

In equation (7), H denotes the transform function before the compensation and H' denotes the transform function after the compensation, further, $P_1$ denotes a threshold value determining the dynamic range (hereinafter, referred to as "dynamic range threshold value") and has a value which becomes larger as the illumination level becomes higher. Accordingly, the dark region in the input image is transformed to have a higher luminance, which may increase the visibility in a bright environment. Meanwhile, in equation (7), a denotes a constant which can be determined according to the dynamic range threshold value. The values $P_1$ and a may be set through pre-testing to have values which may raise the visibility to be as high as possible according to each illumination level.

The transform unit 160 transforms the luminance for the input image by using the compensated transform function from the compensation unit 150 and then outputs an image resulted from the transformation. The output image from the transform unit 160 may be displayed through a display unit, such as a Liquid Crystal Display (LCD), a Plasma Display Panel, or an organic electroluminescent (EL) display.

Hereinafter, an exemplary embodiment of the cumulative density function modification unit 130 will be described, first, a case in which the second cumulative density function is provided according to the illumination level is first described with reference to FIGS. 3 and 4.

Figure 3:
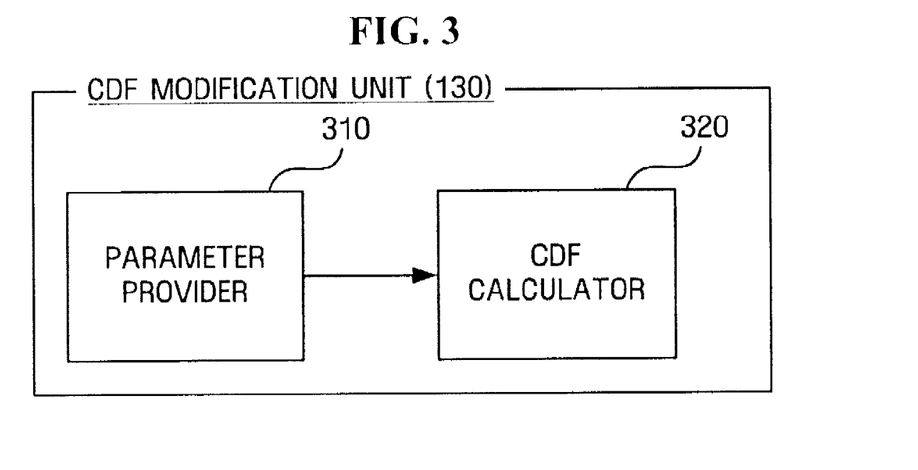
FIG. 3 is a block diagram of a cumulative-density-function-modification unit according to an exemplary embodiment of the present invention.

FIG. 3 is a block diagram of the cumulative density function modification unit 130 according to an exemplary embodiment of the present invention. As shown, the cumulative density function modification unit 130 includes a parameter provider 310 and a cumulative density function calculator 320.

The parameter provider 310 provides a tone gain for which the first cumulative density function is compensated according to the illumination level provided by the illumination level determination unit 120. Typically, a larger tone gain is associated with a higher illumination level because the larger the contrast of an image, the better the visibility of the image.

The cumulative density function calculator 320 calculates the second cumulative density function modified from the first cumulative density function based on the tone gain provided by the parameter provider 310. According to an exemplary embodiment of the present invention, the second cumulative density function calculated by the cumulative density function calculator 320 can be defined by equation (8) below.

$$G = F \times P_2 \times c (0 \leq P_2 \leq 255) \quad (8)$$

In equation (8), G denotes the second cumulative density function, F denotes the first cumulative density function, and $P_2$ denotes the tone gain. Further, in equation (8), c denotes an additive function in order to derive the second cumulative density function from the first cumulative density function and can be expressed in various forms according to exemplary embodiments of the present invention. According to an exemplary embodiment of the present invention, c can be expressed by equation (9) below.

$$c = \frac{1}{P_2}, \quad \text{if } F = K \quad (9)$$
$$c = 1 - \left(\frac{F-K}{K}\right), \quad \text{if } F \neq K$$

Figure 4:
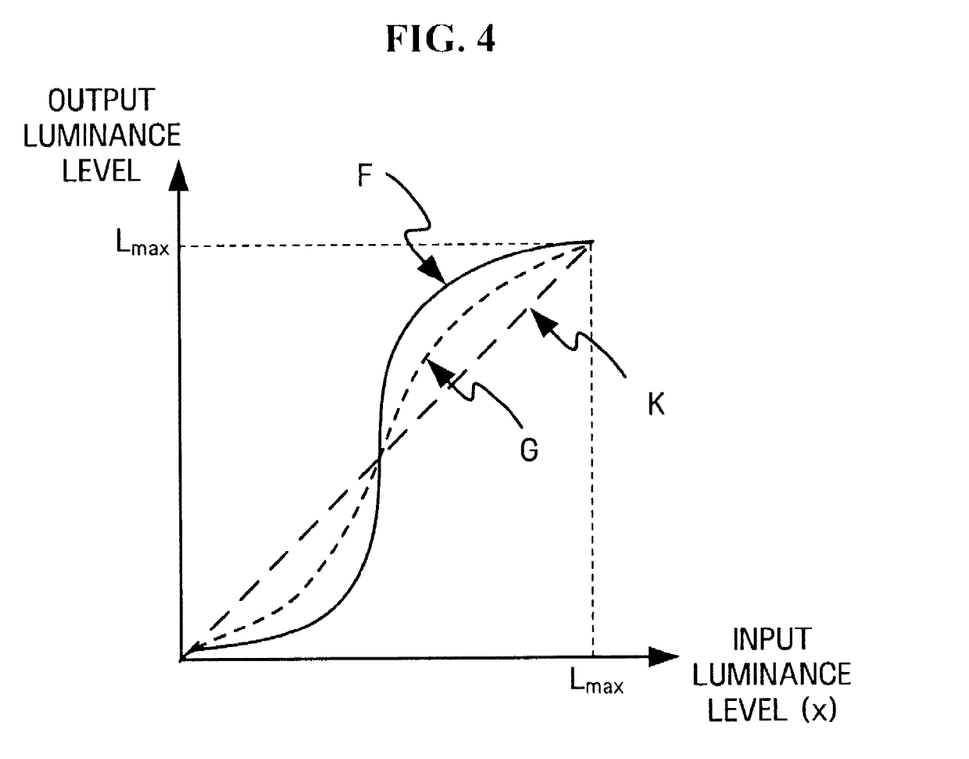
FIG. 4 is a graph illustrating a second cumulative density function according to an exemplary embodiment of the present invention.

In equation (9), K corresponds to the linear broken line with an inclination of 45 degrees in FIG. 4. When the function K is used as the transform function, the input value is the same as the output value. That is, when the input image is applied to the function K, the output image shows no change in the luminance with respect to the input image. Hereinafter, the function K, by which the input becomes equal to the output, is referred to as a reference function. FIG, 4 shows (he first cumulative density function F and the second cumulative density function G calculated through equation (8) as well as the function K.

By using the transform function calculated by the transform function provider 140 based on the second cumulative density function calculated in the way described above, it is possible to increase the visibility of an output image by increasing the contrast of the output image according to an increase in the illumination level, and to prevent excessive contrast increase in an environment having a low illumination level such as indoor environment.

As another exemplary embodiment of the present invention, a case in which the cumulative density function modification unit 130 provides the second cumulative density function through pixel re-distribution for an input image will be described hereinafter with reference to FIGS. 5 to 8.

Figure 5:
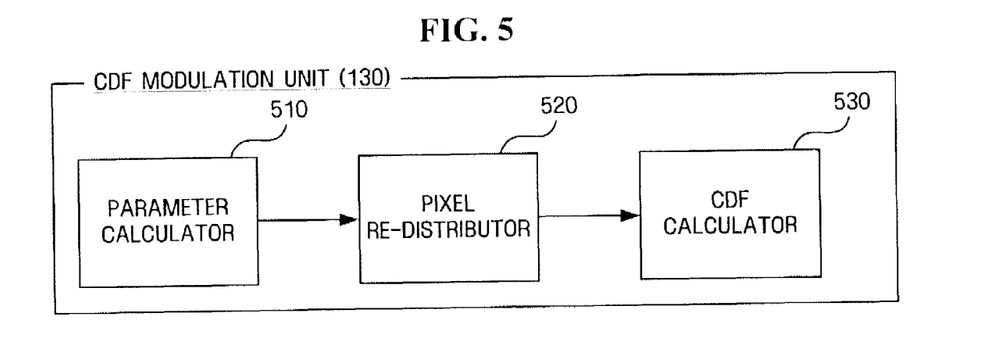
FIG. 5 is a block diagram of a cumulative-density-function-modification unit according to another exemplary embodiment of the present invention.

FIG. 5 is a block diagram of the cumulative density function modification unit 130 according to another exemplary embodiment of the present invention. As shown, the cumulative density function modification unit 130 includes a parameter calculator 510, a pixel re-distributor 520, and a cumulative density function calculator 530.

The parameter calculator 510 provides a threshold for determination of the pixel re-distribution quantity. To this end, the parameter calculator 510 first calculates a luminance change rate of an input image in the case of applying the first cumulative density function as a transform function. The luminance change rate can be understood as the same concept as a histogram change ratio in the case of applying the first cumulative density function as a transform function. Hereinafter, calculation of the luminance change rate according to an exemplary embodiment of the present invention will be described with reference to FIG. 6.

Figure 6:
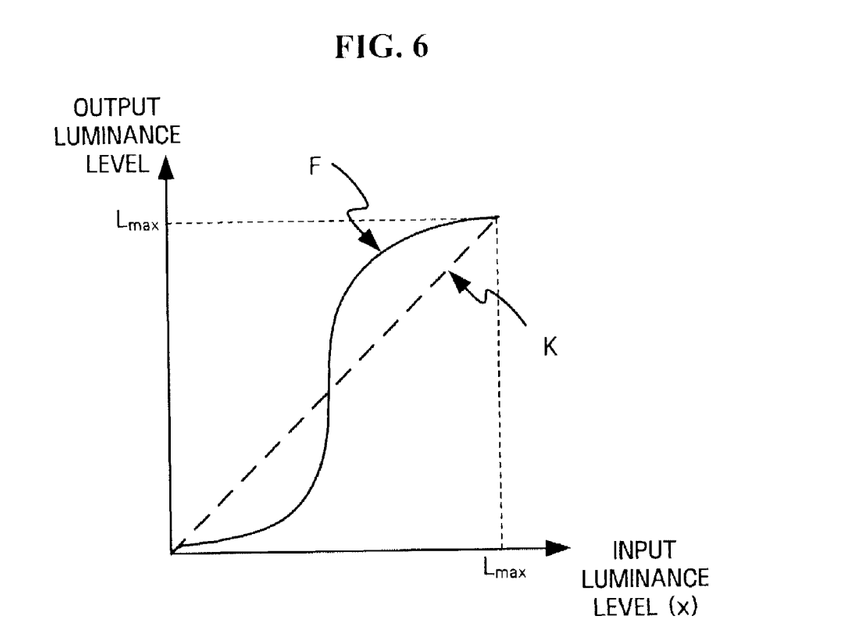
FIG. 6 is a graph illustrating a cumulative density function according to an exemplary embodiment of the present invention.

In FIG. 6, as in FIG. 4, K corresponds to the reference function and F corresponds to the first cumulative density function. The luminance change rate R can be obtained by equation (10) below.

$$R = \frac{\int_0^{L_{max}} |K - F| dx}{L_{max} \times 1.0} \tag{10}$$

In equation (10), $L_{max}$ denotes a maximum value of the luminance level, which can exist in an image. Because the luminance level typically has a value of 0-255, $L_{max}$ may have a value of 255.

The parameter calculator 510 calculates a threshold for determination of pixel re-distribution quantity for the first luminance histogram based on the luminance change rate. In this exemplary embodiment, the threshold has a relatively small value for a relatively large luminance change rate and a relatively large value for a relatively small luminance change rate.

As an exemplary embodiment for calculation of the threshold, the parameter calculator 510 may use two threshold determination functions which employ the luminance change rate as an input value. The parameter calculator 510 can calculate the pixel re-distribution quantity by a first threshold determination function when the luminance change rate is larger than or equal to a first threshold ratio and can calculate the pixel re-distribution quantity by a second threshold determination function when the luminance change rate is smaller than the first threshold ratio. The first threshold determination function has a value smaller than that of the second threshold determination function. That is, the first threshold determination function and the second first determination function have a relation as defined by equation (11) below.

$$1^{st} \text{ threshold determination function} < 2^{nd} \text{ threshold determination function} \tag{11}$$

When it is determined that the quantity of change of the first cumulative density function with respect to the reference function is too large, the parameter calculator 510 lowers the threshold. In contrast, when it is determined that the quantity of change of the first cumulative density function is too small, the parameter calculator 510 raises the threshold. The first threshold ratio and the threshold determination function can be so determined through pre-testing as to produce an optimized threshold.

The first threshold determination function and the second threshold determination function according to an exemplary embodiment of the present invention can be defined equations (12) and (13) below.

$$t = 4.0R (\text{if, } R \geq 0.09) \tag{12}$$

$$t = R \times 300 (\text{if, } R < 0.09) \tag{13}$$

In equations (12) and (13), t denotes a threshold, R denotes a luminance change rate described above with reference to equation (10), and 0.09 corresponds to a threshold ratio. Further, in equations (12) and (13), the constants, such as 0.09, 4.0, and 300, have been calculated through pre-testing in order to obtain optimized results and may have different values according to different exemplary embodiments. The parameter calculator 510 calculates the threshold t either by using equation (12) when the luminance change rate is larger than or equal to the threshold ratio 0.09 or by using equation (13) when the luminance change rate is smaller than the threshold ratio 0.09.

Although the parameter calculator 510 calculates the threshold by using two threshold determination functions in the above-described exemplary embodiments, the present invention is not limited to calculation in such a way. For example, the parameter calculator 510 may calculate the threshold by using one or more threshold determination functions which employ the luminance change rate as an input value. However, regardless of the number of threshold determination functions used for calculation of the threshold, the calculation of the parameter calculator 510 shows a result that the higher the luminance change rate, the lower the threshold, and the lower the luminance change rate, the higher the threshold.

Referring again to FIG. 5, the pixel re-distributor 520 generates the second luminance histogram by re-distributing the pixels for the first luminance histogram with the threshold calculated by the parameter calculator 510. The process of pixel re-distribution can be understood as a kind of flattening for the first luminance histogram. That is, during the pixel re-distribution, the number of pixels at a luminance level of a high pixel density decreases while the number of pixels at a luminance level of a low pixel density increases, and the number of the increasing pixel and the number of the decreasing pixel are proportional to the threshold.

Specifically, if the threshold is calculated in the form of the number of pixels, a sum of the number of pixels increased during the pixel re-distribution is equal to the threshold, as defined by equation (14).

$$P_{count} = t \tag{14}$$

In equation (14), $P_{count}$ denotes a sum of the number of pixels to be increased, and t denotes the threshold.

If the threshold is calculated in the form of a ratio as an another example, the pixel re-distributor 520 increases the pixels until a proportion of the to-be-increased pixels with respect to all pixels of an input image becomes equal to the threshold, as expressed by equation (15) below.

$$\frac{P_{count}}{P_{total}} \times 100 = t \tag{15}$$

In equation (15), $P_{count}$ denotes a sum of the number of pixels to be increased, $P_{total}$ denotes the number of all pixels of the first luminance histogram, and t denotes the threshold. In equation (15), the ratio is expressed by percentage, which is only an example. Therefore, if the threshold is calculated in the form of a ratio, the sum $P_{count}$ of the number of pixels to be increased for the entire luminance levels of the first luminance histogram by the pixel re-distributor 520 can be expressed as multiplication between the threshold and the number of total pixels of the first luminance histogram.

Figure 7:
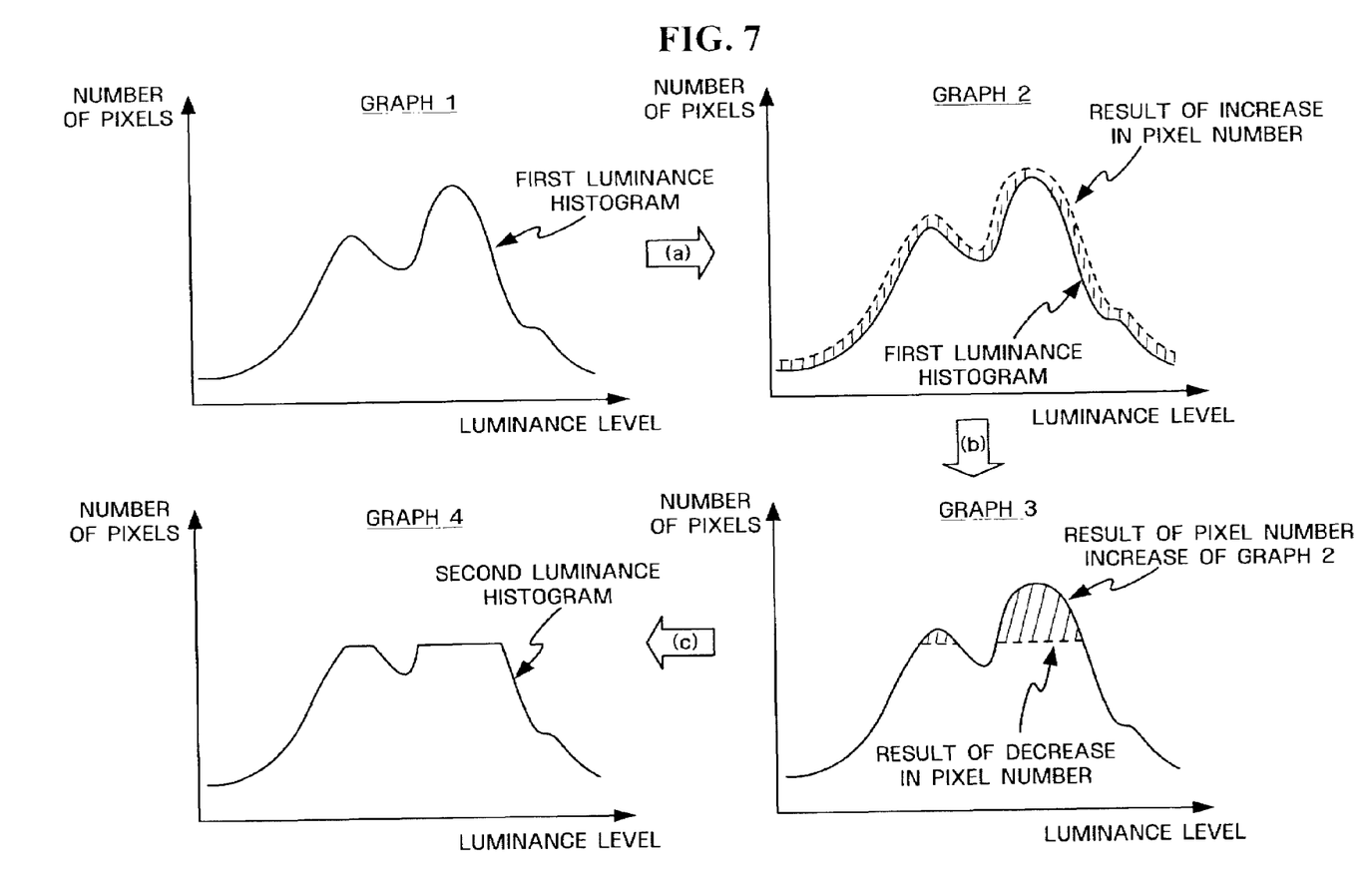
FIG. 7 illustrates a process of pixel re-distribution according to an exemplary embodiment of the present invention.

FIG. 7 illustrates a process of pixel re-distribution according to an exemplary embodiment of the present invention. In FIG. 7, graph 1 illustrates the first luminance histogram. First, the pixel re-distributor 520 increases the number of pixels at each luminance level of the first luminance histogram as indicated by arrow (a). Then, the number of increased pixels is uniform for each luminance level, and the sum of the increased pixels is determined by the threshold. More specifically, the sum of the number of increased pixels is set in proportion to the threshold.

Graph 2 shows an intermediate luminance histogram obtained by increasing the number of pixels in the first luminance histogram. In graph 2, the solid line represents the first luminance histogram of graph 1, and the broken line represents the result after increase of the pixels at each luminance level of the first luminance histogram. The increased number of pixels corresponds to the region (hatched region) between the broken line and the solid line of graph 2.

Thereafter, the pixel re-distributor 520 decreases the number of pixels in the pixel-increased first luminance histogram in an order from a luminance level having the highest pixel density in a direction toward a luminance level having a lowest pixel density, as indicated by arrow (b). During this process, the sum of the decreased pixels must be equal to the sum of the increased pixels. In other words, the sum of the decreased pixels may be also determined by the threshold. Because the number of decreased pixels is equal to the number of increased pixels, there is no change in the number of total pixels. The state of reduction in the number of pixels is shown in graph 3. In graph 3, the solid line corresponds to the broken line in graph 2, which represents the result after increase of the pixels in the first luminance histogram, and the broken line (under the hatched portion) represents a result of the decreasing of the pixels in the order of luminance level. The portion under the broken line is not separately marked because corresponding segments of the broken line overlap with those of the solid line. Therefore, in graph 3, the area between the solid line and the broken line (the hatched area) is proportional to the threshold.

As a result of the above-described process as indicated by arrow (c), it is possible to obtain a final result of pixel re-distribution for the first luminance histogram, which is shown in graph 4 of FIG. 7. The luminance histogram finally obtained from the pixel re-distribution is the second luminance histogram. Through the pixel re-distribution as described above, it is possible to expect an effect that the second cumulative density function to be generated converges to a reference function.

According to an exemplary embodiment of the present invention, it is possible to emphasize the white components of an image by maintaining the increased number of pixels in graph 2 of FIG. 7 for the high luminance level range in which pixels of the second threshold ratio are distributed in an order from the highest luminance level to the lowest luminance level from among the entire pixels of the intermediate luminance histogram obtained by increasing the number of pixels in the first luminance histogram. In a similar manner, it is possible to emphasize the black components of an image by maintaining the increased number of pixels in graph 2 of FIG. 7 for the low luminance level range in which pixels of the second threshold ratio are distributed in an order from the lowest luminance level to the highest luminance level from among the entire pixels of the intermediate luminance histogram obtained by increasing the number of pixels in the first luminance histogram. The second threshold ratio may become different according to a target value for emphasis of the white components or black components. It this exemplary embodiment the second threshold ratio is 5%. This exemplary embodiment will be described in more detail with reference to FIG. 8.

Figure 8:
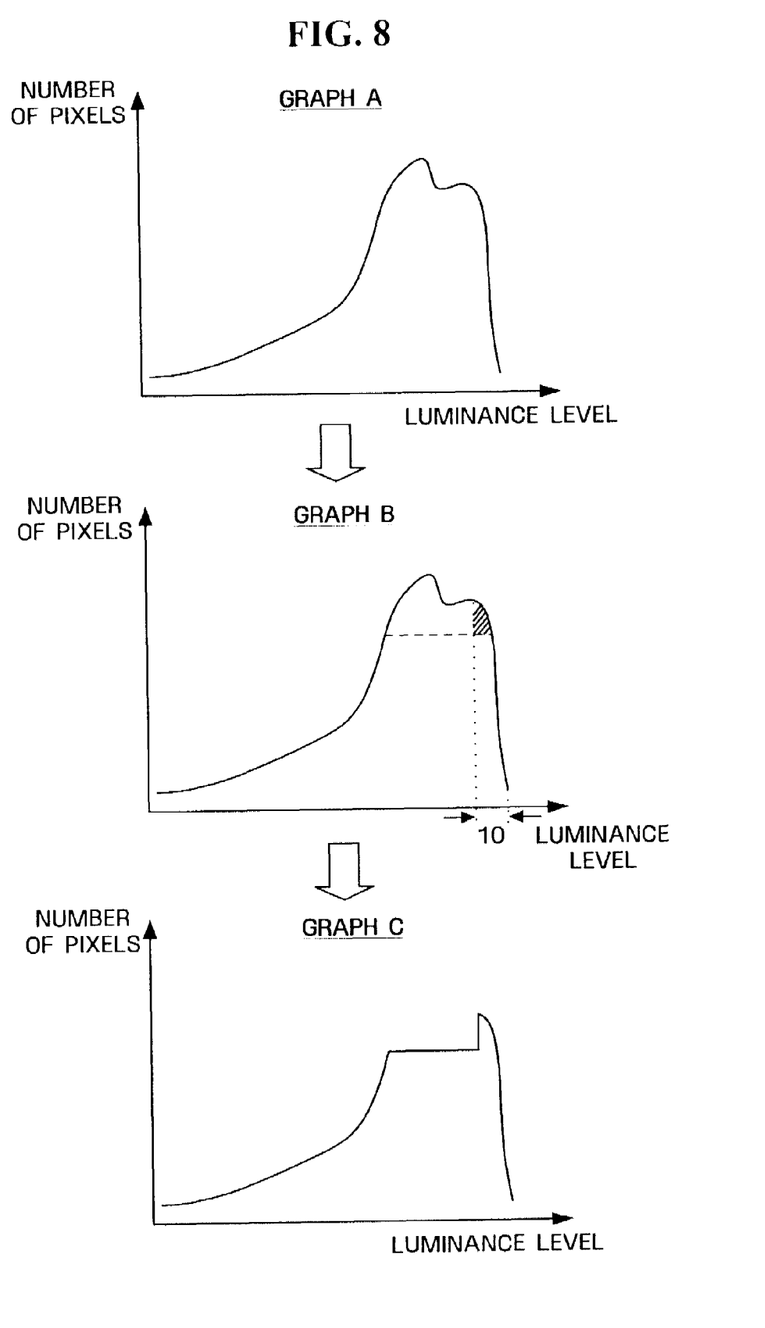
FIG. 8 illustrates a process of pixel re-distribution according to another exemplary embodiment of the present invention.

In FIG. 8, from the state in which the number of pixels has been increased for the entire luminance levels of the first luminance histogram as shown in Graph A corresponding to the result of a process indicated by arrow (a) of FIG. 7, the number of pixels is decreased in an order from a luminance level having the highest pixel density to a luminance level having the lowest pixel density as is in a process indicated by arrow (b) of FIG. 7. However, as noted from Graph 11 of FIG. 8, if the luminance levels, for which the number of pixels is to be decreased, include the high luminance level range 10 in which pixels of the second threshold ratio are distributed in an order from the highest luminance level to the lowest luminance level from among the entire pixels distributed in Graph A, it is possible to emphasize the white components of the image by maintaining the number of pixels instead of decreasing the number for the high luminance level range 10. In FIG. 8, the portion, in which the number of pixels is not decreased, is marked by hatching. Then, the number of pixels at other luminance levels is increased in the order giving a priority to a higher pixel density instead of the high luminance level range 10, and the result of the pixel re-distribution is produced as shown in Graph C of FIG. 8.

Referring again to FIG. 5, the cumulative density function calculator 530 calculates the second cumulative density function based on the second luminance histogram. The process of calculating the second cumulative density function is similar to the process of calculating the first cumulative density function, so detailed description thereof will be omitted here.

As used herein, the "unit" for indicating functional blocks of the contrast control apparatus in FIGS. 1, 3, and 5 can be implemented by a type of module. The "module" refers to a software element or a hardware element, such as a field programmable gate array (FPGA) or an application specific integrated circuit (ASIC), which performs a predetermined function. However, the module does not always have a meaning limited to software or hardware. The module may be constructed either to be stored in an addressable storage medium or to execute one or more processors. Therefore, the module includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the modules may be either combined into a smaller number of elements or modules or divided into a larger number of elements or modules.

Hereinafter, an operation of the above-mentioned contrast control apparatus will be described with reference to FIGS. 9 to 11.

Figure 9:
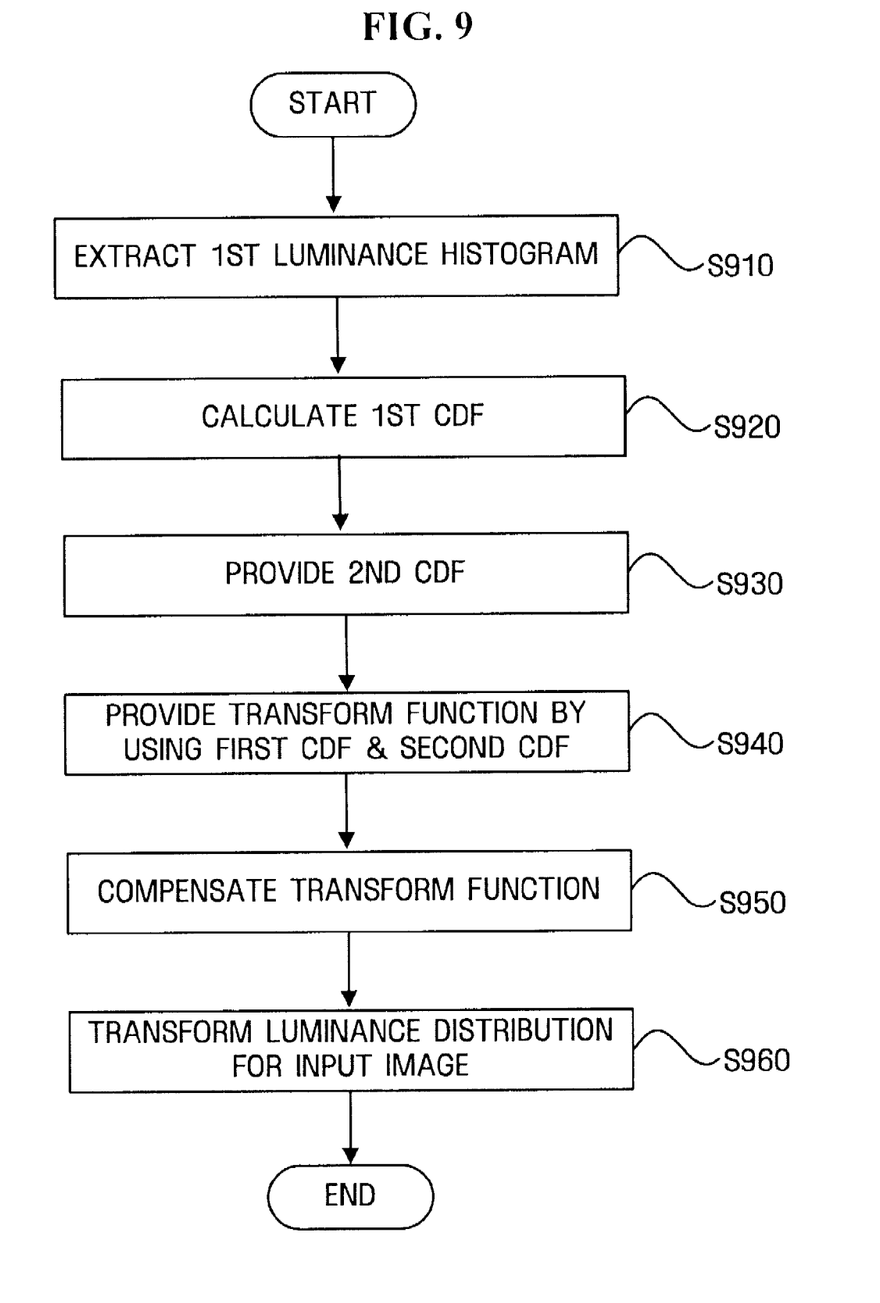
FIG. 9 is a flowchart of a process of contrast control according to an exemplary embodiment of the present invention.

FIG. 9 is a flowchart of a process for contrast control according to an exemplary embodiment of the present invention.

First, when an image is input, the luminance analyzer 110 extracts a first luminance histogram from the input image (operation S910), and calculates a first cumulative density function based on the extracted first luminance histogram (operation S920).

Then, the cumulative density function modification unit 130 provides a second cumulative density function which is modified from the first cumulative density function of the input image (operation S930). The cumulative density function modification unit 130 may provide the second cumulative density function either according to the illumination level provided by the illumination level determination unit 120 or through pixel re-distribution for the input image. Specific exemplary embodiments of operation S930 will be described later with reference to FIGS. 10 and 11.

When the second cumulative density function has been calculated, the transform function provider 140 provides a transform function by using the first cumulative density function calculated by the luminance analyzer 110 and the second cumulative density function provided by the cumulative density function modification unit 130 (operation S940). The transform function can be calculated as a composite function of the first cumulative density function and the inverse function of the second cumulative density function as described above with reference to equations (2) to (6).

Upon receiving the transform function provided by the transform function provider 140, the compensation unit 150 compensates the transform function according to an illumination level determined by the illumination level determination unit 120 (operation S950). As an example of the compensation, it is possible to change the dynamic range of an output value of the transform function as described above with reference to FIG. 4. In this case, the compensation unit 150 may store a threshold value for the dynamic range according to the illumination level, and the transform function may be compensated by using equation (7) and a dynamic range threshold corresponding to an illumination level determined by the illumination level determination unit 120.

Thereafter, the transform unit 160 transforms the luminance distribution of the input image by using the transform function compensated by the compensation unit 150 (operation S960). The image (i.e. output image) obtained after the transformation of the luminance distribution of the input image may be displayed by a display unit or stored in a storage medium.

Figure 10:
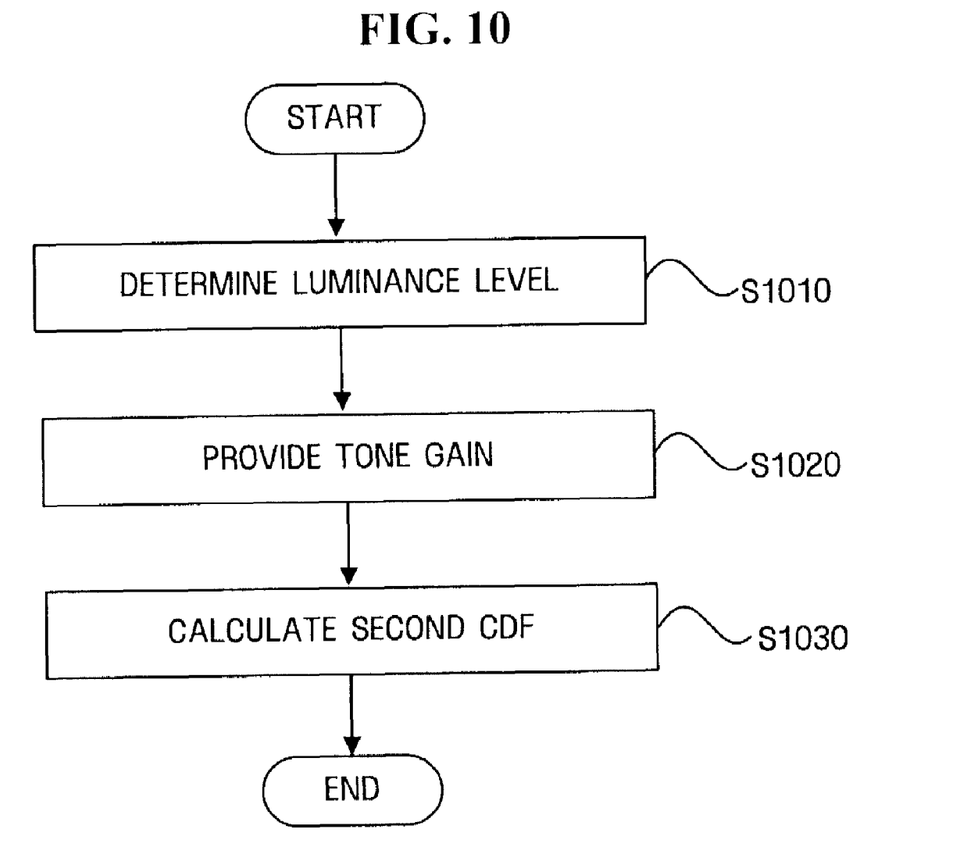
FIG. 10 is a flowchart illustrating an exemplary embodiment of the second cumulative density function providing step (S930) of FIG. 9.

FIG. 10 is a flowchart illustrating an exemplary embodiment of the second cumulative density function providing operation S930 of FIG. 9. The process shown in FIG. 10 is based on the construction of the cumulative density function modification unit 130 as shown in FIG. 3.

First, when the illumination level determination unit 120 determines an illumination level (operation S1010), the parameter provider 310 provides a tone gain corresponding to the illumination level (operation S1020). To this end, the parameter provider 310 may store tone gains corresponding to illumination levels in advance, which may be determined through pre-testing.

Thereafter, the cumulative density function calculator 320 calculates a second cumulative density function modified from the first cumulative density function, based on the tone gain provided by the parameter provider 310 (operation S1030). The second cumulative density function may depart from the first cumulative density function and approaches the reference function (K in FIG. 4) as the tone gain increases. According to an exemplary embodiment of the present invention, equation (8) described above may be used for calculation of the second cumulative density function.

Figure 11:
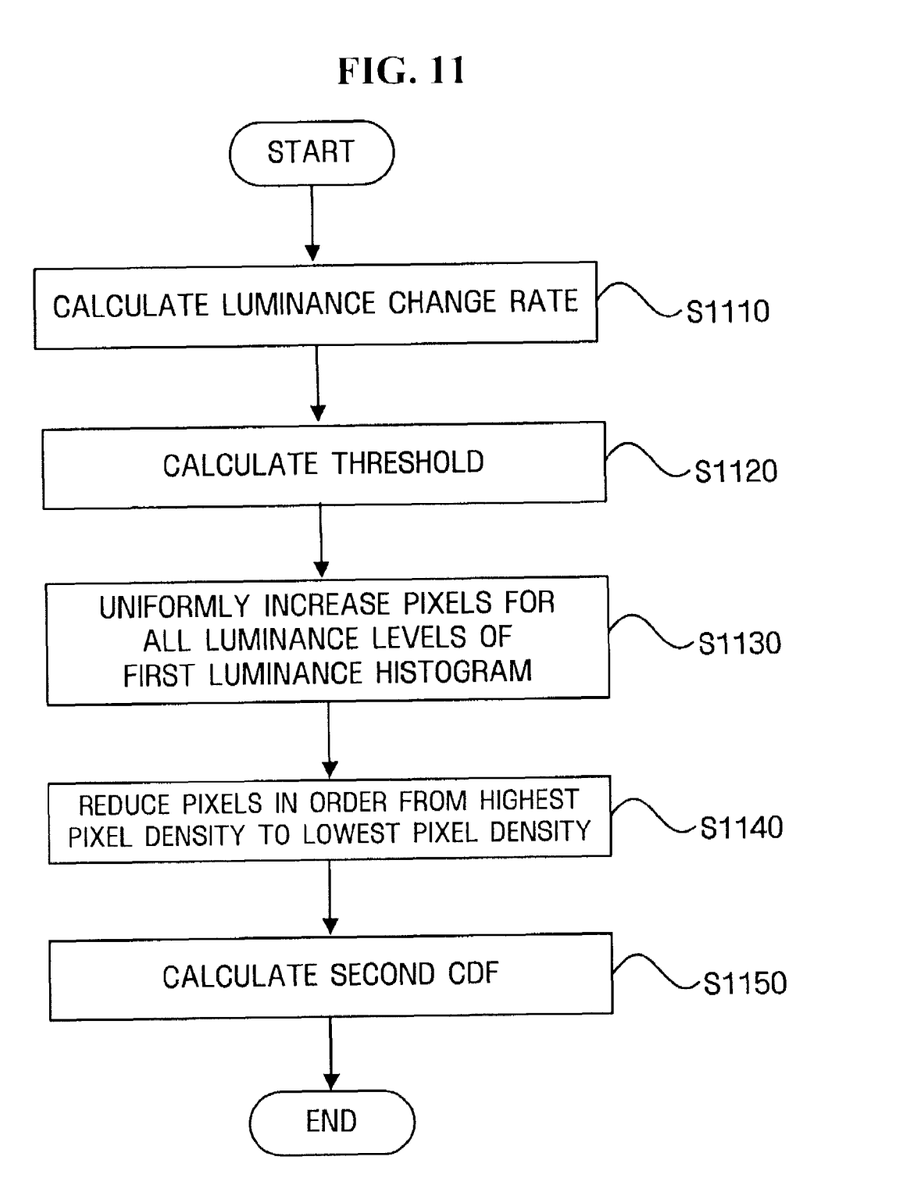
FIG. 11 is a flowchart illustrating another exemplary embodiment of the second cumulative density function providing step (S930) of FIG. 9.

FIG. 11 is a flowchart illustrating another exemplary embodiment of the second cumulative density function providing operation S930 of FIG. 9. The process shown in FIG. 11 is based on the construction of the cumulative density function modification unit 130 as shown in FIG. 5.

First, the parameter calculator 510 calculates a luminance change rate of an input image for the case of using the first cumulative density function as a transform function (operation S1110) and calculates the threshold according to the luminance change rate (operation S1120). In order to calculate the threshold, the parameter calculator 510 may use a threshold determination function which employs the luminance change rate as an input value. The higher the luminance change rate, the lower the solution yielded by the threshold determination function. In contrast, the lower the luminance change rate, the higher the solution yielded by the threshold determination function. When the luminance change rate is larger than or equal to the first threshold ratio, the parameter calculator 510 calculate the threshold by using the first threshold determination function which employs the luminance change rate as an input value. When the luminance change rate is smaller than the first threshold ratio, the parameter calculator 510 calculates the threshold by using the second threshold determination function which employs the luminance change rate as an input value. The first threshold determination function yields a solution which is smaller than that of the second threshold determination function, as noted from equations (12) and (13).

When the threshold has been calculated, the pixel re-distributor 520 uniformly increases the number of pixels for each luminance level of the first luminance histogram (operation S1130). At this time, the sum of the increased number of pixels is proportional to the threshold calculated by the parameter calculator 510.

Thereafter, the pixel re-distributor 520 decreases the number of pixels in an order from a luminance level having the highest pixel density to a luminance level having the lowest pixel density in the pixel number-increased first luminance histogram (operation S1140). The sum of the number of decreased pixels during this operation is equal to the sum of the number of increased pixels in operation S1130. A result obtained after decreasing the number of pixels in operation S1140 is the second luminance histogram.

According to an exemplary embodiment of the present invention, when decreasing the number of pixels in operation S1140, the pixel re-distributor 520 may maintain the number of pixels having been increased in operation S1130 instead of reducing the number for the high luminance level range in which pixels of the second threshold ratio are distributed in an order from the highest luminance level to the lowest luminance level from among the entire pixels of the intermediate luminance histogram obtained by increasing the number of pixels in the first luminance histogram. In a similar manner, the pixel re-distributor 520 may emphasize the black components of an image by maintaining the number of pixels having been increased in operation S1130 instead of reducing the number for the low luminance level range in which pixels of the second threshold ratio are distributed in an order from the lowest luminance level to the highest luminance level from among the entire pixels of the intermediate luminance histogram obtained by increasing the number of pixels in the first luminance histogram.

When the second luminance histogram has been obtained, the cumulative density function calculator 530 calculates the second cumulative density function based on the second luminance histogram (operation S1150).

A method and an apparatus for contrast control according to the exemplary embodiments as described above may produce one or more of the following effects. However, the exemplary embodiments are not required to provide these effects.

First, it may be possible to prevent excessive increase of contrast in an image

Second, it may also be possible to improve the visibility by controlling a dynamic range of an output image according to the change in the brightness of an environment.

Although several exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of controlling contrast implemented by an image apparatus comprising a processor having computing device-executable instructions, the method comprising:
    providing a second cumulative density function modified from a first cumulative density function based on a first luminance histogram of an input image;
    providing a transform function by using the first cumulative density function and the second cumulative density function;
    compensating the transform function based on an illumination level; and
    transforming a luminance distribution of the input image based on the compensated transform function.

2. The method of claim 1, wherein the providing of the second cumulative density function comprises compensating the first cumulative density function based on the illumination level, wherein the second cumulative density function is a result of compensation of the first cumulative density function.

3. The method of claim 2, wherein the compensating the first cumulative density function comprises:
    providing a tone gain corresponding to the illumination level; and
    calculating the second cumulative density function from the first cumulative density function in proportion to the tone gain.

4. The method of claim 1, wherein the providing of the second cumulative density function comprises:
    generating a second luminance histogram through pixel re-distribution of the first luminance histogram of the input image; and
    calculating the second cumulative density function based on the second luminance histogram.

5. The method of claim 4, wherein the generating of the second luminance histogram comprises:
    calculating a luminance change rate when the luminance distribution of the input image is changed based on the first cumulative density function;
    providing a threshold according to the luminance change rate;
    uniformly increasing a first number of pixels for each luminance level of the first luminance histogram; and
    reducing a second number of pixels in an order from a luminance level having a highest pixel density to a luminance level having a lowest pixel density in an intermediate luminance histogram obtained by increasing the first number of pixels in the first luminance histogram,
    wherein a total number of increased pixels is proportional to the threshold, and a total number of decreased pixels is equal to the total number of increased pixels.

6. The method of claim 5, wherein the providing of the threshold comprises:
    calculating the threshold based on a first threshold determination function which employs the luminance change rate if the luminance change rate is greater than or equal to a first threshold ratio; and
    calculating the threshold based on a second threshold determination function that employs the luminance change rate if the luminance change rate is smaller than the first threshold ratio,
    wherein the threshold calculated based on the first threshold determination function is smaller than the threshold calculated using the second threshold determination function.

7. The method of claim 5, wherein the providing the threshold comprises calculating the threshold based on a threshold determination function which employs the luminance change rate, and the calculated threshold is inversely proportional to the luminance change rate.

8. The method of claim 5, wherein, the reducing of the number of pixels comprises reducing the number of pixels for a luminance level range obtained by excluding a high luminance level range and a low luminance level range from the intermediate luminance histogram, wherein pixels of a first threshold ratio, among all the pixels of the intermediate luminance histogram, are distributed in an order from a highest luminance level to a lowest luminance level in the high luminance level range, and pixels of a second threshold ratio, among entire pixels of the intermediate luminance histogram, are distributed in an order from a lowest luminance level to a highest luminance level in the low luminance level range.

9. The method of claim 1, wherein, a composite function comprising the first cumulative density function and the inverse function of the second cumulative density function is provided as the transform function.

10. The method of claim 1, wherein the compensating the transform function comprises controlling a dynamic range of the transform function according to the illumination level.

11. The method of claim 10, wherein, the controlling the dynamic range involves setting the transform function to have an output value ranging from a dynamic range threshold to a maximum value of the luminance level,
    wherein the dynamic range threshold corresponds to the illumination range.

12. The method of claim 1, further comprising measuring the illumination level.

13. An image apparatus for controlling contrast, comprising:
    a processor;
    a cumulative density function (CDF) modification unit, controlled by the processor, that provides a second cumulative density function modified from a first cumulative density function based on a first luminance histogram of an input image;
    a transform function provider which provides a transform function by using the first cumulative density function and the second cumulative density function;
    a compensation unit, controlled by the processor, that compensates the transform function based on an illumination level; and
    a transform unit, controlled by the processor, that transforms a luminance distribution of the input image based on the transform function compensated by the compensation unit.

14. The apparatus of claim 13, wherein the CDF modification unit provides the second cumulative density function by compensating the first cumulative density function based on the illumination level.

15. The apparatus of claim 14, wherein the CDF modification unit comprises:
- a parameter provider which provides a tone gain corresponding to the illumination level; and
- a CDF calculator which calculates the second cumulative density function from the first cumulative density function in proportion to the tone gain.

16. The apparatus of claim 13, wherein the CDF modification unit comprises:
- a pixel re-distributor which generates a second luminance histogram through pixel re-distribution for the first luminance histogram of the input image; and
- a CDF calculator which calculates the second cumulative density function based on the second luminance histogram.

17. The apparatus of claim 16, further comprising a parameter calculator which calculates a luminance change rate when a luminance distribution of the input image is changed, based on the first cumulative density function, and provides a threshold based on the luminance change rate,
- wherein the pixel re-distributor uniformly increases a first number of pixels for each luminance level of the first luminance histogram, and reduces a second number of pixels in an order from a luminance level having a highest pixel density to a luminance level having a lowest pixel density in an intermediate luminance histogram obtained by increasing the first number of pixels in the first luminance histogram,
- wherein a total number of increased pixels is proportional to the threshold, and a total number of decreased pixels is equal to the first number of increased pixels.

18. The apparatus of claim 17, wherein the parameter calculator calculates the threshold based on a first threshold determination function which employs the luminance change rate if the luminance change rate is greater than or equal to a first threshold ratio, and calculates the threshold based on a second threshold determination function which employs the luminance change rate if the luminance change rate is less than the first threshold ratio,
- wherein the threshold calculated based on the first threshold determination function is smaller than the threshold calculated based on the second threshold determination function.

19. The apparatus of claim 17, wherein the parameter calculator calculates the threshold based on a threshold determination function which employs the luminance change rate, and the calculated threshold is inversely proportional to the luminance change rate.

20. The apparatus of claim 17, wherein the parameter calculator reduces the number of pixels for a luminance level range obtained by excluding a high luminance level range and a low luminance level range from the intermediate luminance histogram which is obtained by increasing the number of pixels in the first luminance histogram, wherein pixels of a first threshold ratio from among entire pixels of the intermediate luminance histogram are distributed in an order from a highest luminance level to a lowest luminance level in the high luminance level range, and pixels of a second threshold ratio from among entire pixels of the intermediate luminance histogram are distributed in an order from a lowest luminance level to a highest luminance level in the low luminance level range.

21. The apparatus of claim 13, wherein the transform function provided by the transform function provider comprises a composite function of the first cumulative density function and the inverse function of the second cumulative density function.

22. The apparatus of claim 13, wherein the compensation unit controls a dynamic range of the transform function according to the illumination level.

23. The apparatus of claim 22, wherein the compensation unit sets the transform function to have an output value ranging from a dynamic range threshold to a maximum value of the luminance level,
- wherein the dynamic range threshold corresponds to the illumination range.

24. The apparatus of claim 13, further comprising an illumination level determination unit for measuring the illumination level.

* * * * *